(12) United States Patent
Thom et al.

(10) Patent No.: US 10,092,963 B2
(45) Date of Patent: *Oct. 9, 2018

(54) TOOTHFORM FOR A CUTTING TOOL, SUCH AS A HOLE SAW

(71) Applicant: MILWAUKEE ELECTRIC TOOL CORPORATION, Brookfield, WI (US)

(72) Inventors: Jason M. Thom, Wauwatosa, WI (US); Geoffrey R. Piller, Shorewood, WI (US); Ryan J. Malloy, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/679,214

(22) Filed: Aug. 17, 2017

(65) Prior Publication Data

US 2018/0021862 A1    Jan. 25, 2018

Related U.S. Application Data

(63) Continuation of application No. 13/945,686, filed on Jul. 18, 2013, now Pat. No. 9,751,134.

(60) Provisional application No. 61/673,131, filed on Jul. 18, 2012.

(51) Int. Cl.
*B23B 51/04* (2006.01)

(52) U.S. Cl.
CPC ....... *B23B 51/0406* (2013.01); *Y10T 408/895* (2015.01)

(58) Field of Classification Search
CPC ..... B23B 51/04; B23B 51/0406; B23B 51/05; B23D 61/021; B23D 61/121; Y10T 408/895; Y10T 408/8957
See application file for complete search history.

(56) References Cited

U.S. PATENT DOCUMENTS

| | | | |
|---|---|---|---|
| 23,330 | A | 3/1859 | Wilson |
| 492,407 | A | 2/1893 | Mallette |
| 2,412,433 | A | 12/1946 | Taylor |
| 3,025,917 | A | 3/1962 | Knoblauch |
| 3,144,058 | A | 8/1964 | Carter |
| 3,362,446 | A | 1/1968 | Potomak |
| 3,820,233 | A | 6/1974 | Baker |
| 4,527,449 | A | 7/1985 | Sydlowski et al. |
| 5,018,421 | A | 5/1991 | Lucki et al. |
| 5,038,653 | A | 8/1991 | Slocum |

(Continued)

FOREIGN PATENT DOCUMENTS

| | | |
|---|---|---|
| CA | 2374640 | 9/2001 |
| CH | 1550974 | 8/1976 |

(Continued)

*Primary Examiner* — Eric A Gates
(74) *Attorney, Agent, or Firm* — Michael Best & Friedrich LLP

(57) ABSTRACT

A cutting tool includes a body, a plurality of cutting teeth formed on the body, a plurality of non-cutting protrusions formed on the body, and a plurality of gullets formed on the body. Each gullet is formed between one of the plurality of cutting teeth and one of the plurality of non-cutting protrusions. Each gullet has a base and a gullet depth measured from the base to a tip of a corresponding cutting tooth. Each non-cutting protrusion is located approximately halfway between the tips of two adjacent cutting teeth and has a height that is at most about 75% of the gullet depth.

22 Claims, 4 Drawing Sheets

(56) References Cited

U.S. PATENT DOCUMENTS

| | | |
|---|---|---|
| 5,092,716 A | 3/1992 | Omi |
| 5,205,685 A | 4/1993 | Herbert |
| 5,261,306 A | 11/1993 | Morey et al. |
| 5,606,900 A | 3/1997 | Stoddard |
| 5,803,677 A | 9/1998 | Brutscher et al. |
| 5,803,678 A | 9/1998 | Korb et al. |
| 5,868,058 A | 2/1999 | Senegas |
| 6,007,279 A | 12/1999 | Malone, Jr. |
| 6,120,220 A | 9/2000 | Speare |
| 6,158,324 A | 12/2000 | Kullmann et al. |
| 6,167,792 B1 | 1/2001 | Korb et al. |
| 6,227,188 B1 | 5/2001 | Tankala et al. |
| 6,269,722 B1 | 8/2001 | Hellbergh |
| 6,588,310 B2 | 7/2003 | Lee et al. |
| 6,588,992 B2 | 7/2003 | Rudolph |
| 6,601,495 B2 | 8/2003 | Cranna |
| 6,691,596 B1 | 2/2004 | Singh et al. |
| 6,719,422 B2 | 4/2004 | Wu et al. |
| 6,834,573 B1 | 12/2004 | Nakahara |
| 7,013,784 B2 | 3/2006 | Lowder et al. |
| 7,036,415 B2 | 5/2006 | Tsujimoto |
| 7,140,451 B2 | 11/2006 | Yoshimizu et al. |
| 7,174,823 B2 | 2/2007 | Cranna |
| 7,225,714 B2 | 6/2007 | Rompel et al. |
| D551,269 S | 9/2007 | Burke, III |
| 7,275,898 B2 | 10/2007 | Malagnino et al. |
| 7,658,136 B2 | 2/2010 | Rompel et al. |
| 8,113,100 B1 | 2/2012 | Cranna et al. |
| 8,234,961 B2 | 8/2012 | Vogel et al. |
| 2002/0078813 A1 | 6/2002 | Hoffman |
| 2002/0184981 A1 | 12/2002 | Tsujimoto |
| 2002/0194974 A1 | 12/2002 | Morris et al. |
| 2003/0000363 A1 | 1/2003 | Hofmann et al. |
| 2003/0177645 A1 | 9/2003 | Flury et al. |
| 2004/0016125 A1 | 1/2004 | Asada et al. |
| 2004/0065183 A1 | 4/2004 | Asada |
| 2004/0255749 A1 | 12/2004 | Hayden, Sr. |
| 2006/0207402 A1 | 9/2006 | Davidson et al. |
| 2007/0234870 A1 | 10/2007 | Brabfilev |
| 2008/0022832 A1 | 1/2008 | Curtsinger |
| 2011/0132168 A1 | 6/2011 | Nagano |
| 2011/0154970 A1 | 6/2011 | Oshibe et al. |
| 2011/0170972 A1 | 7/2011 | Zielonka et al. |
| 2011/0217133 A1 | 9/2011 | Ibarra et al. |
| 2011/0259168 A1 | 10/2011 | Butzen et al. |
| 2011/0271815 A1 | 11/2011 | Elliston et al. |
| 2012/0090443 A1 | 4/2012 | Butzen et al. |
| 2012/0093599 A1 | 4/2012 | Evatt et al. |

FOREIGN PATENT DOCUMENTS

| | | |
|---|---|---|
| DE | 10116092 | 10/2002 |
| EP | 1078706 | 2/2001 |
| JP | 2002103125 | 4/2002 |
| JP | 2003527975 | 9/2003 |
| JP | 2007290112 | 11/2007 |
| KR | 100575264 | 4/2006 |
| WO | WO0170471 | 9/2001 |
| WO | WO2013098963 | 7/2013 |

…

TOOTHFORM FOR A CUTTING TOOL, SUCH AS A HOLE SAW

CROSS-REFERENCE TO RELATED APPLICATIONS

This application is a continuation of U.S. patent application Ser. No. 13/945,686, filed Jul. 18, 2013, now U.S. Pat. No. 9,751,134, which claims priority to U.S. Provisional Patent Application No. 61/673,131, filed Jul. 18, 2012, the entire contents of both of which are incorporated by reference herein.

BACKGROUND

The present invention relates to toothforms for cutting tools and, more particularly, to toothforms for hole saws.

Hole saws are typically used to cut holes in work pieces made of wood or metal. During use, cutting teeth of the hole saws may be impacted by nails or other hard objects embedded in the work pieces.

SUMMARY

In one embodiment, the invention provides a cutting tool including a generally cylindrical body having an open end and a closed end, and a plurality of cutting teeth formed on the open end of the generally cylindrical body. Each cutting tooth includes a tip, a rake face extending from the tip, and a relief surface extending from the tip. The cutting tool also includes a plurality of non-cutting protrusions formed on the open end of the generally cylindrical body. Each non-cutting protrusion has an apex. The cutting tool further includes a plurality of gullets formed on the open end of the generally cylindrical body. Each gullet is formed between one of the plurality of cutting teeth and one of the plurality of non-cutting protrusions. Each gullet has a base and a gullet depth measured from the base to the tip of a corresponding cutting tooth. Each non-cutting protrusion is located approximately halfway between the tips of two adjacent cutting teeth. Each non-cutting protrusion has a height measured from the base of the gullet to the apex that is at most about 75% of the gullet depth.

In another embodiment, the invention provides a cutting tool including a generally cylindrical body having an open end and a closed end, and a plurality of cutting teeth formed on the open end of the generally cylindrical body. Each cutting tooth includes a tip, a rake face extending from the tip, a planar relief portion extending from the tip, a concave relief portion extending from the planar relief portion, and a convex relief portion extending from the concave relief portion. The cutting tool also includes a plurality of gullets formed on the open end of the generally cylindrical body. Each gullet is formed between the rake face of one cutting tooth and the convex relief face portion of an adjacent cutting tooth. Each cutting tooth has a tooth width measured from the rake face through the convex relief portion. The concave relief portion of each cutting tooth forms at least about 40% of the tooth width.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. As used herein, the term "about" means within one significant figure when referring to a length, distance, angle, slope, or the like, and within one percent when referring to a percentage.

DETAILED DESCRIPTION

Figure 1:
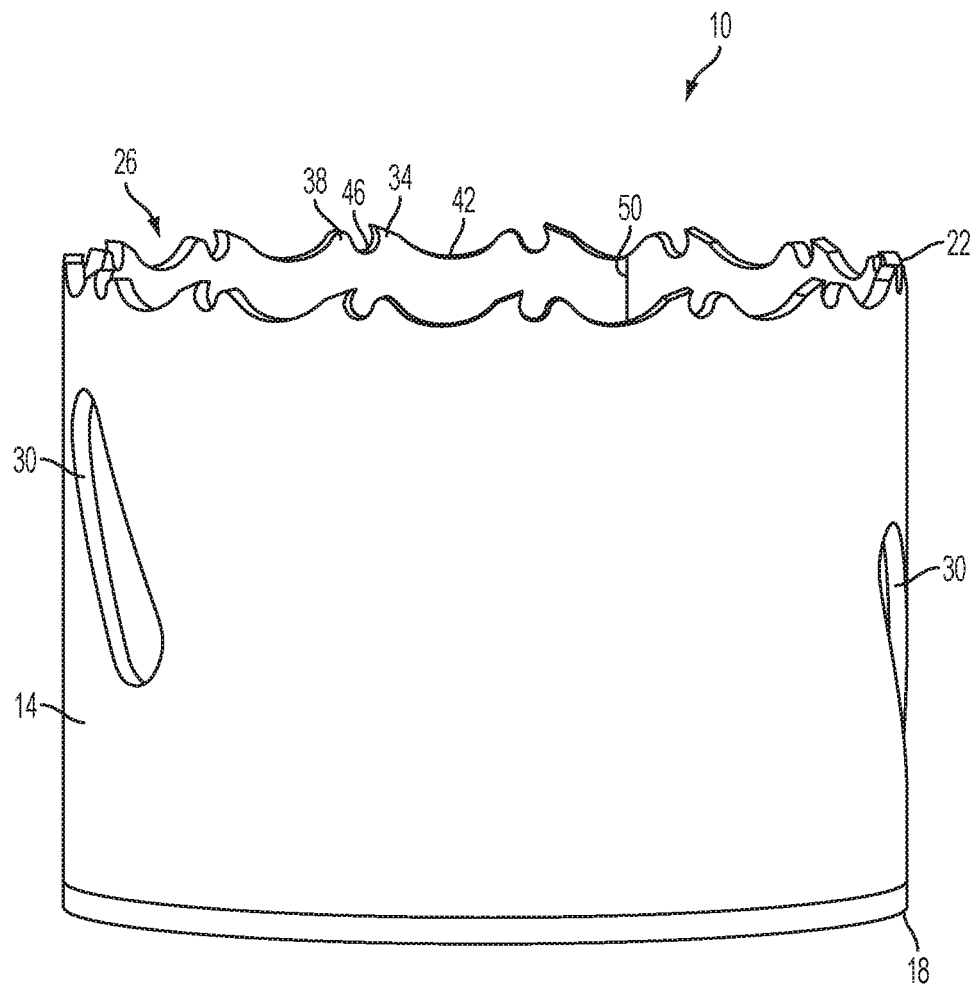
FIG. 1 is a perspective view of a hole saw including a toothform according to one embodiment of the invention.

FIG. 1 illustrates a cutting tool 10 embodying the invention. In the illustrated embodiment, the cutting tool 10 is a hole saw. The hole saw 10 is connectable to and driven (e.g., rotated) by a power tool, such as a drill, to cut holes and/or remove plugs from a work piece.

The illustrated hole saw 10 includes a generally cylindrical body 14 having a first, closed end 18 and a second, open end 22. The first end 18 is configured to mount to an arbor for connecting the hole saw 10 to a chuck of a power tool. The second end 22 includes a toothform 26 that is configured to cut through a work piece. At least one opening 30 is formed in the body 14 between the first and second ends 18, 22 to facilitate chip and plug removal from the hole saw 10.

Figure 2:
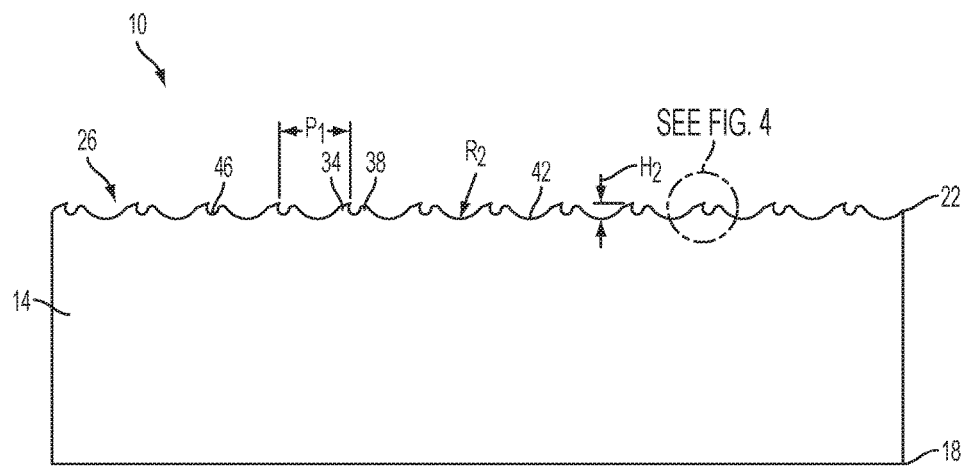
FIG. 2 is a side view of the hole saw shown in FIG. 1, the hole saw being illustrated in a flattened condition.

As shown in FIG. 2, the toothform 26 is defined by cutting teeth 34, non-cutting protrusions 38, primary gullets 42, and secondary gullets 46. The teeth 34 are all generally the same shape and size. One protrusion 38 is associated with each tooth 34 and positioned forward of the tooth 34 in a cutting direction such that the teeth 34 and the protrusions 38 are paired together. The primary gullets 42 are formed between pairs of adjacent teeth 34 and protrusions 38. One of the secondary gullets 46 is formed between the tooth 34 and the protrusion 38 in each pair. This pattern of tooth 34, secondary gullet 46, protrusion 38, and primary gullet 42 repeats along the entire length of the second end 22 of the body 14 to define the toothform 26. In the illustrated embodiment, the teeth 34 are spaced apart such that the toothform 26 has a pitch $P_1$ of between about 0.2 inches and about 0.5 inches. In other embodiments, the teeth 34 may be spaced apart by a larger or smaller amount.

Figure 3:
FIG. 3 is an edge view of the hole saw shown in FIG. 2.

As shown in FIG. 3, the hole saw body 14 has a thickness $T_1$ of about 0.05 inches. In other embodiments, the body 14 may be relatively thinner or thicker. The body 14 is bent into a circle and welded together at a weld line 50 (FIG. 1) to form the generally cylindrical shape of the hole saw 10.

Figure 4:
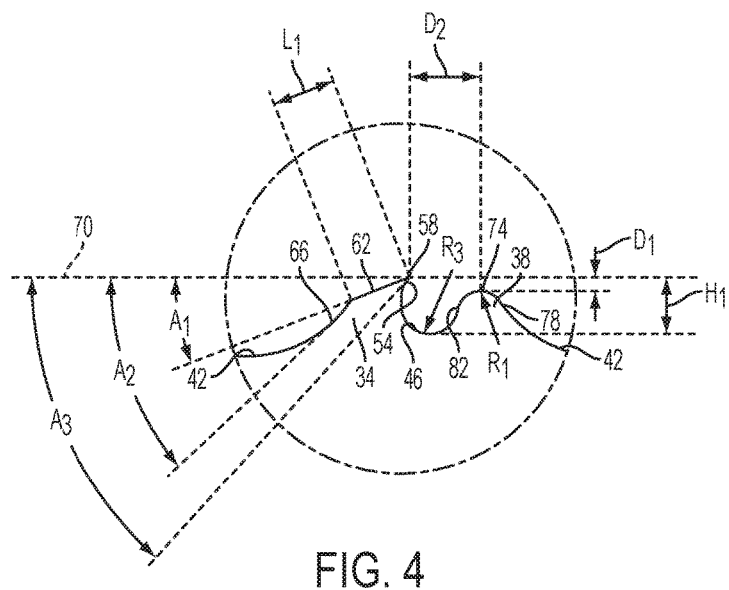
FIG. 4 is an enlarged view of a portion of the hole saw shown in FIG. 2.

FIG. 4 illustrates one pair of a tooth 34 and a protrusion 38, with a secondary gullet 46 positioned therebetween, in more detail. The illustrated tooth 34 includes a rake face 54, a tip 58, a primary relief surface 62, and a secondary relief surface 66. The tip 58 defines a cutting plane 70 that is generally parallel to the second end 22 of the body 14. The tooth 34 has a first height $H_1$ measured from a base of the corresponding secondary gullet 46 to the tip 58 of the tooth 34, and a second height $H_2$ (FIG. 2) measured from a base of the corresponding primary gullet 42 to the tip 58 of the tooth 34. In the illustrated embodiment, the first height $H_1$ is between about 0.02 inches and about 0.11 inches, and the second height $H_2$ is between about 0.05 inches and about 0.12 inches.

The primary relief surface 62 extends from the tip 58 and is angled relative to the cutting plane 70 by a primary relief angle $A_1$. In the illustrated embodiment, the primary relief angle $A_1$ is between about 10 degrees and about 40 degrees. In addition, the primary relief surface 62 has a relief length $L_1$ measured from the tip 58 to the secondary relief surface 66 of between about 0.02 inches and 0.1 inches.

The secondary relief surface 66 extends from the primary relief surface 62 and transitions into the primary gullet 42. The secondary relief surface 66 is angled relative to the cutting plane 70 by a secondary relief angle $A_2$ that is greater than the primary relief angle $A_1$. In the illustrated embodiment, the secondary relief angle $A_2$ is between about 30 degrees and about 70 degrees.

The rake face 54 extends from the tip 58 and transitions into the secondary gullet 46. The rake face 54 is angled relative to the cutting plane 70 by an angle $A_3$. In the illustrated embodiment, the angle $A_3$ is between about 45 degrees and about 90 degrees such that the tooth 34 has a rake angle of between about 0 degrees and about 45 degrees and an included angle between about 5 degrees and about 80 degrees. In some embodiments, the rake angle may be about 25 degrees and the included angle may be about 45 degrees. In other embodiments, one or more dimensions of the tooth 34 (such as the first height $H_1$, the second height $H_2$, the primary relief angle $A_1$, the relief length $L_1$, the secondary relief angle $A_2$, or the rake angle) may be relatively larger or smaller.

The non-cutting protrusion 38 is a generally rounded projection formed in the second end 22 of the body 14 in front of the rake face 54 of the tooth 34. The protrusion 38 helps protect the tooth 34 from major impacts and helps guide material while the hole saw 10 cuts through a work piece. In particular, the protrusion 38 limits the amount of the tooth 34 that is exposed during cutting operations to only the portion of the tooth 34 that actually cuts the work piece (e.g., the tip 58 of the tooth 34). Such an arrangement reduces the amount of material that may enter the gullet 46 in front of the tooth 34.

The illustrated protrusion 38 includes an apex 74, which represents the highest point of the protrusion 38, a leading edge 78, and a trailing edge 82. The protrusion 38 is generally shorter than the corresponding tooth 34 such that the apex 74 is spaced apart a first distance $D_1$ from the cutting plane 70. In addition, the apex 74 is spaced apart a second distance $D_2$, measured parallel to the cutting plane 70, from the tip 58 of the tooth 34. In the illustrated embodiment, the first distance $D_1$ is between about 0.01 inches and about 0.02 inches, and the second distance $D_2$ is between about 0.1 inches and about 0.15 inches. In other embodiments, the first and second distances $D_1$, $D_2$ may be larger or smaller.

The leading edge 78 extends from the apex 74 to the primary gullet 42. The trailing edge 82 extends from the apex 74 to the secondary gullet 46. In the illustrated embodiment, the leading and trailing edges 42, 46 are curved such that the protrusion 38 has a radius $R_1$ of between about 0.02 inches and about 0.07 inches. In other embodiments, the protrusion 38 may form a larger or smaller radius. In still other embodiments, the leading and/or trailing edges 42, 46 may have different geometries, such as linear edges.

As shown in FIG. 2, each of the primary gullets 42 forms a trough area between adjacent pairs of teeth 34 and protrusions 38. The illustrated primary gullets 42 define radii $R_2$ of between about 0.1 inches and about 0.2 inches. In other embodiments, the primary gullets 42 may define larger or smaller radii.

Referring back to FIG. 4, the secondary gullet 46 is formed in the second end 22 of the body 14 between the tooth 34 and the protrusion 38 in a given pair. Each of the secondary gullets 46 is generally shallower than the primary gullets 42. In the illustrated embodiment, the secondary gullet 46 has a radius $R_3$ of between about 0.03 inches and about 0.06 inches. In other embodiments, the secondary gullet 46 may have a larger or smaller radius.

Figure 5:
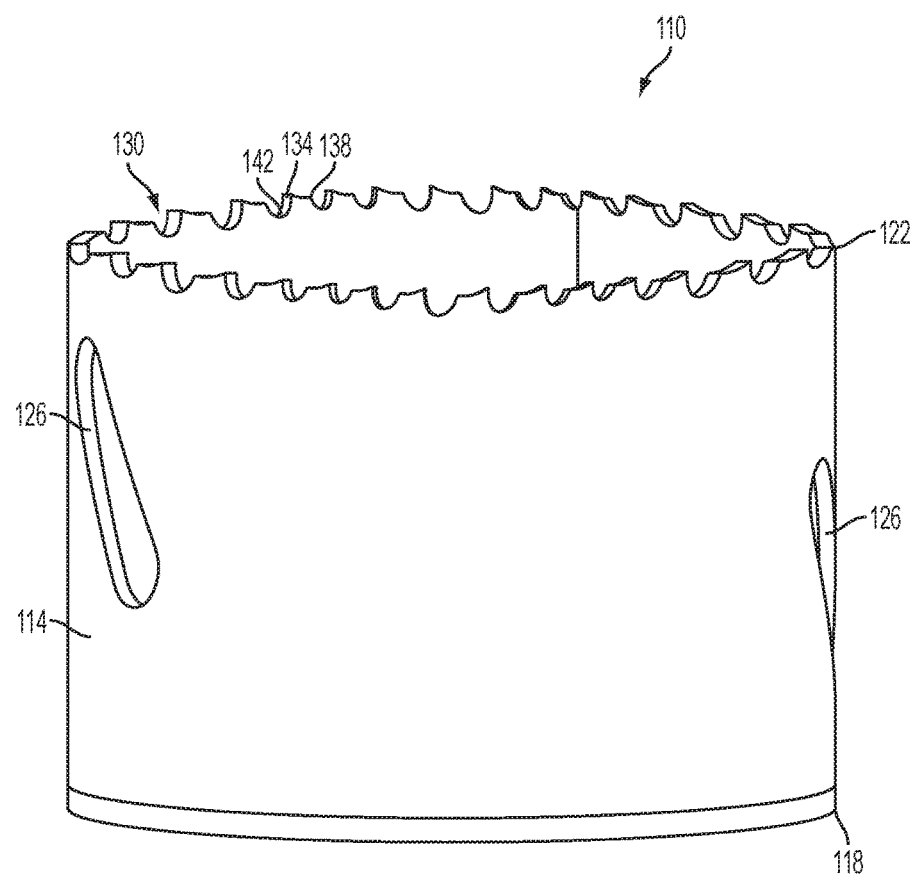
FIG. 5 is a perspective view of a hole saw including a toothform according to another embodiment of the invention.

FIG. 5 illustrates another cutting tool 110 embodying the invention. Similar to the cutting tool 10 discussed above, the illustrated cutting tool 110 is a hole saw. The hole saw 110 of FIG. 5 includes similar features as the hole saw 10 of FIG. 1. In particular, the illustrated hole saw 110 includes a generally cylindrical body 114 having a first, closed end 118, a second, open end 122, and at least one opening 126 formed in the body 114 between the ends 118, 122 to facilitate chip and plug removal.

Figure 6:
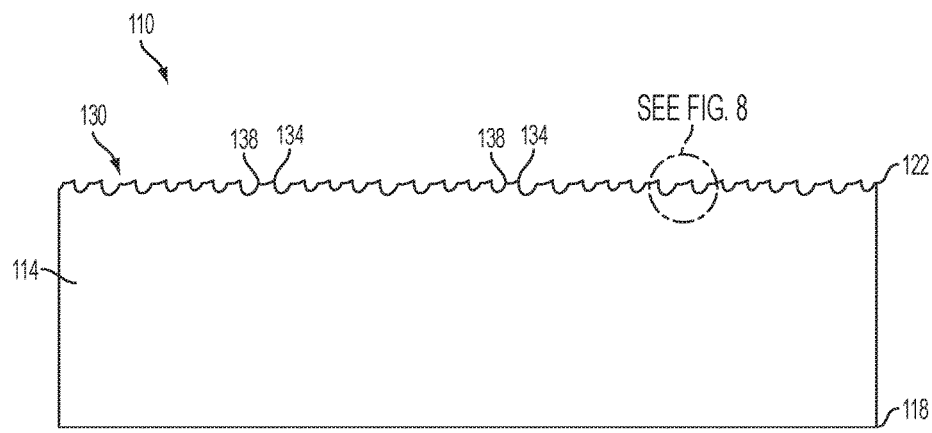
FIG. 6 is a side view of the hole saw shown in FIG. 5, the hole saw being illustrated in a flattened condition.

The hole saw 110 also includes a toothform 130 formed on the open end 122 of the body 114. As shown in FIG. 6, the toothform 130 is defined by a repeating pattern of cutting teeth 134, non-cutting protrusions 138, and gullets 142. The illustrated teeth 134 have generally the same shape, but vary in size around the open end 122 of the body 114. In the illustrated embodiment, the toothform 130 includes a pattern of five cutting teeth 134 that repeats around the open end 122 of the body 114, giving the hole saw 110 a 4/6 tooth per inch (TPI) pitch. In other embodiments, the toothform 130 may include a pattern of fewer or more cutting teeth 134 that repeats around the open end 122 of the body 114. In still further embodiments, each of the cutting teeth 134 may be generally the same size. Additionally or alternatively, the pitch of the cutting teeth 134 may be constant.

Each gullet 142 is formed between one of the teeth 134 and one of the protrusions 138 so that a pattern of tooth 134, gullet 142, and protrusion 138 repeats along the entire length of the open end 122 of the body 110. In addition, each protrusion 138 is positioned close enough to a successive cutting tooth 134 that the protrusion 138 and the cutting tooth 134 are merged together into a single cutting body. Together, the cutting tooth 134 and the protrusion 138 define a tooth width $W_1$.

Figure 7:
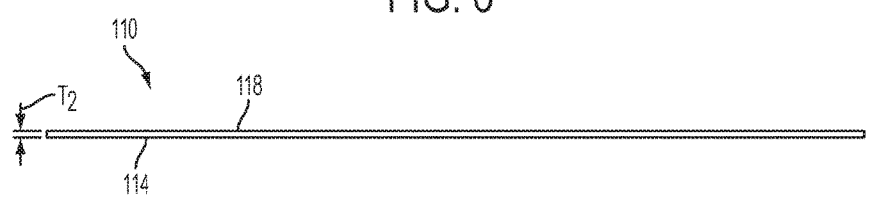
FIG. 7 is an edge view of the hole saw shown in FIG. 5.

As shown in FIG. 7, the hole saw body 114 has a thickness $T_2$ of about 0.05 inches. In other embodiments, the body 114 may be relatively thinner or thicker.

Figure 8:
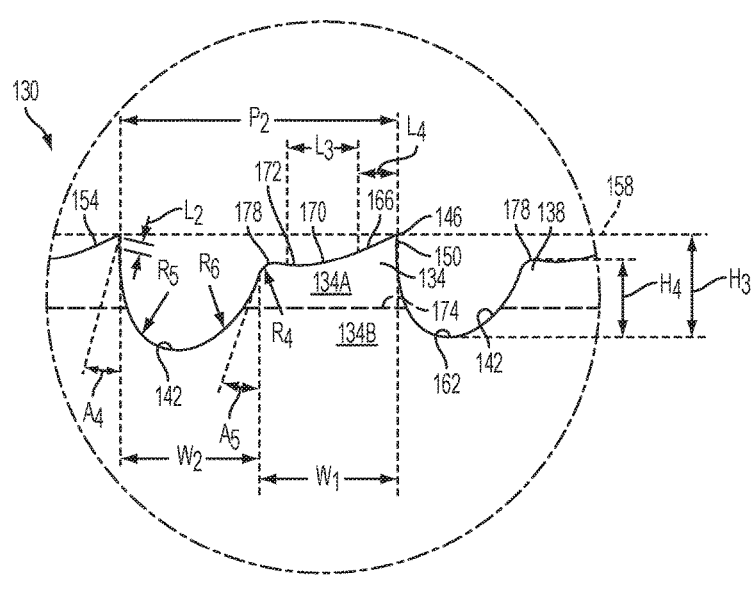
FIG. 8 is an enlarged view of a portion of the hole saw shown in FIG. 6.

FIG. 8 illustrates a portion of the toothform 130 in more detail. The illustrated tooth 134 of the toothform 130 includes a tip 146, a rake face 150 extending in a first direction from the tip 146, and a relief surface 154 extending in a second direction from the tip 146. The tip 146 defines a cutting plane 158 that is generally parallel to the closed end 118 of the body 114. The tooth 134 has a tooth height $H_3$ measured from a base 162 of the gullet 142 positioned forward of the tooth 134 in the cutting direction to the cutting plane 158 defined by the tip 146 of the tooth 134. The tooth height $H_3$ also represents a gullet depth of the gullet 142. In the illustrated embodiment, the tips 146 of the cutting teeth 134 all define the same cutting plane 158. The cutting teeth 134 have different heights, which is achieved by varying the sizes (i.e., depths) of the corresponding gullets 142 (e.g., by varying the locations of the bases 162 of the gullets 142 relative to the closed end 118 of the body 114). In other embodiments, the tips 146 of the cutting teeth 134 may define different cutting planes.

The rake face 150 of the tooth 134 extends from the tip 146 and transitions into the gullet 142. The illustrated rake face 150 has a relatively large positive rake angle $A_4$, but is relatively short. In the illustrated embodiment, the rake angle $A_4$ is about 7 degrees (measured from a plane perpendicular to the cutting plane 158). In addition, a length $L_2$ of the rake face 150 is between about 0.006 inches and about 0.012 inches. In other embodiments, the rake angle $A_4$ may be relatively larger, smaller, or even negative, and/or the rake length $L_2$ may be relatively longer or shorter.

The illustrated relief surface 154 of the tooth 134 includes a planar relief portion 166 and a concave relief portion 170. The planar relief portion 166 extends from the tip 146 to the concave relief portion 170. The concave relief portion 170 extends from the planar relief portion 166 to the protrusion 138. The concave relief portion 170 is concave toward the closed end 118 of the body 114 to form a secondary gullet 172 between the tip 146 of the cutting tooth 134 and the protrusion 138. As shown in FIG. 8, each of the cutting teeth 134 is divided into a first portion 134A and a second portion 134B by a weld line 174. In the illustrated embodiment, the concave relief portion 170, and thereby the secondary gullet 172, is positioned one side of the weld line 174 (e.g., above as shown in FIG. 8) such that the weld line 174 of each tooth 134 is not interrupted by the secondary gullet 172.

Since the non-cutting protrusion 138 is merged with the cutting tooth 134, the protrusion 138 extends from an end of the relief surface 154 opposite from the tip 146 to form part of the relief surface 154. In particular, the protrusion 138 forms a convex relief portion of the relief surface 154 that extends from the concave relief portion 170 and transitions into the gullet 142. The protrusion 138 is curved in an opposite direction than the concave relief portion 170 (i.e., away from the closed end 118 of the body 114) so that the protrusion 138 includes an apex 178 at its furthest point from the closed end 118 of the body 114. In the illustrated embodiment, the protrusion 138 is continuously rounded and has a radius $R_4$ between about 0.01 inches and about 0.02 inches. In some embodiments, each of the protrusions 138 may have generally the same radius of curvature. In other embodiments, each of the protrusions 138 in the repeating pattern of the toothform 130 may have a different radius of curvature. In further embodiments, the protrusions 138 may be non-rounded and may come to a point.

Similar to the cutting tooth 134, the non-cutting protrusion 138 has a height $H_4$ measured from the base 162 of the adjacent, preceding gullet 142 to the apex 178 of the protrusion 138. The height $H_4$ of the protrusion 138 is at most about 75% of the gullet depth (or tooth height $H_3$) of the corresponding gullet 142. In some embodiments, the height $H_4$ of the protrusion 138 is between about 55% and about 75% of the gullet depth. In the illustrated embodiment, the height $H_4$ of the protrusion 138 is about 75% of the gullet depth.

As noted above, the cutting tooth 134 and the protrusion 138 together define the tooth width $W_1$, which is measured from the rake face 150 of the cutting tooth 134 through the protrusion 138 (i.e., to the start of the preceding gullet 142). In the illustrated embodiment, the tooth width $W_1$ of each tooth 134 is approximately half of a pitch distance $P_2$ from the tip 146 of the tooth 134 to the tip 146 of a preceding tooth 134 in the cutting direction of the hole saw 110. In other words, the tooth width $W_1$ of each tooth 134 is generally equal to a gullet width $W_2$ of the preceding gullet 142, which is measured from the tip 146 of the preceding tooth 134 to the protrusion 138. With such an arrangement, each non-cutting protrusion 138 is located approximately halfway between the tips 146 of two adjacent cutting teeth 134. By "approximately halfway," the protrusions 138 may be located at a position between about 50% and about 60% of the pitch distance $P_2$, and preferably at about 50% of the pitch distance $P_2$.

The illustrated concave relief portion 170 of the relief surface 154 extends through a substantial portion of the tooth width $W_1$ of each cutting tooth 134, while the planar relief portion 166 of the relief surface 154 extends through a relatively small portion of the tooth width $W_1$ of each cutting tooth 134. In particular, the concave relief portion 170 has a length $L_3$ that forms at least about 40% of the tooth width $W_1$, and the planar relief portion 166 has a length $L_4$ that forms at most about 35% of the tooth width $W_1$. In some embodiments, the concave relief portion 170 forms between about 40% and about 75% of the tooth width $W_1$, and the planar relief portion 166 forms between about 15% and about 35% of the tooth width $W_1$. In the illustrated embodiment, the concave relief portion 170 forms between about 60% and 75% of the tooth width $W_1$. By forming such a large portion of the tooth width $W_1$, the concave relief portion 170 defines a more pronounced secondary gullet 172 between the tip 146 of the cutting tooth 134 and the non-cutting protrusion 138 than if the concave relief portion 170 was simply a small radius that transitioned from the relief surface 154 of the tooth 134 to the protrusion 138. The concave relief portion 170, or secondary gullet 172, thereby increases the open volume behind the tip 146 of the cutting tooth 134 (in the cutting direction), which helps define the shape of the protrusion 138 and helps with chip removal out of the hole saw body 114.

The illustrated gullets 142 are generally non-symmetrical. Each gullet 142 is relatively steep and has a large radius $R_5$ adjacent the corresponding cutting tooth 134, but is less steep and has a smaller radius $R_6$ adjacent the non-cutting protrusion 138. In the illustrated embodiment, the gullet 142 transitions from the high positive rake angle $A_4$ (e.g., 7 degrees) of the rake face 150 to the base 162 of the gullet 142 with a relatively steep conic arc, and transitions from the protrusion 138 to the base 162 of the gullet 142 with a relatively shallow conic arc. In the illustrated embodiment, the conic arc extends from the protrusion 138, or convex relief portion of the relief surface 154, at an initial slope $A_5$ of about 17 degrees (measured from a plane perpendicular to the cutting plane 158). This more gradual slope $A_5$ helps with manufacturing the transition between the concave shape of the gullet 142 and the convex shape of the protrusion 138. In other embodiments, the initial slope $A_5$ of the gullet 142 may be relatively larger or smaller.

The non-cutting protrusion 138 is positioned forward in the cutting direction of the associated tooth 134 to help protect the tooth 134 from being sheared off or otherwise damaged during cutting operations. Merging the non-cutting protrusion 138 with the successive cutting tooth 134 increases the total width and cross-sectional area of that tooth 134, thereby increasing the strength of the tooth 134. In addition, positioning the protrusions 138 relatively close to their successive teeth 134 helps maintain relatively large gullets 142 between the teeth 134 for chip removal during cutting. Such an arrangement allows for faster cutting speeds using a more aggressive rake angle on each tooth 134 and larger pitch distances between the teeth 134 (i.e., smaller TPI), without increasing the possibility of the hole saw 110 bouncing along or snagging on a work piece.

Although the toothforms 26, 130 have been described above with reference to a hole saw, the toothforms 26, 130 may also be used on other types of cutting tools with linear or non-linear cutting edges. For example, in some embodiments, the toothforms 26, 130 may be formed on a reciprocating saw blade, a jigsaw blade, a bandsaw blade, a circular saw blade, or the like.

Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. A cutting tool comprising:
   a body having a cutting edge;
   a plurality of cutting teeth formed on the cutting edge of the body, each cutting tooth including a tip, a rake face extending from the tip, and a relief surface extending from the tip;
   a plurality of non-cutting protrusions formed on the cutting edge of the body, each non-cutting protrusion having an apex;
   a plurality of primary gullets formed on the cutting edge of the body, each primary gullet being formed between one of the plurality of cutting teeth and one of the plurality of non-cutting protrusions, each primary gullet having a base and a primary gullet depth measured from the base to the tip of a corresponding cutting tooth; and
   a plurality of secondary gullets formed on the cutting edge of the body, each secondary gullet defined by the relief surface of each cutting tooth between the cutting tooth and one of the plurality of non-cutting protrusions, each secondary gullet having a base and a secondary gullet depth measured from the base to the tip of a corresponding cutting tooth;
   wherein each non-cutting protrusion is located approximately halfway between the tips of two adjacent cutting teeth, and wherein each non-cutting protrusion has a height measured from the base of the primary gullet to the apex that is at most about 75% of the primary gullet depth; and
   wherein the secondary gullet depth of each secondary gullet is shallower than the primary gullet depth of each primary gullet.

2. The cutting tool of claim 1, wherein the height of each non-cutting protrusion is between about 55% and about 75% of the primary gullet depth.

3. The cutting tool of claim 1, wherein the height of each non-cutting protrusion is about 75% of the primary gullet depth.

4. The cutting tool of claim 1, wherein one of the plurality of non-cutting protrusions extends from an end of the relief surface of each cutting tooth opposite from the tip.

5. The cutting tool of claim 4, wherein the relief surface of each cutting tooth includes a planar relief portion extending from the tip and a concave relief portion extending from the planar relief portion to the one of the plurality of non-cutting protrusions, and wherein the concave relief portion of each cutting tooth forms the secondary gullet.

6. The cutting tool of claim 5, wherein each cutting tooth has a tooth width measured from the tip through the one of the plurality of non-cutting protrusions, and wherein the concave relief portion of each cutting tooth forms at least about 40% of the tooth width.

7. The cutting tool of claim 6, wherein the concave relief portion of each cutting tooth forms between about 40% and about 75% of the tooth width.

8. The cutting tool of claim 6, wherein the planar relief portion of each cutting tooth forms at most about 35% of the tooth width.

9. The cutting tool of claim 5, wherein each cutting tooth includes a first portion and a second portion connected together along a weld line, and wherein the secondary gullet is positioned on one side of the weld line.

10. The cutting tool of claim 4, wherein each cutting tooth has a tooth width measured from the tip through the one of the plurality of non-cutting protrusions, wherein each primary gullet has a primary gullet width measured from the one of the plurality of cutting teeth to the one of the plurality of non-cutting protrusions, and wherein the tooth width is generally equal to the primary gullet width.

11. The cutting tool of claim 1, wherein the rake face of each cutting tooth extends from the tip at a positive rake angle of about 7 degrees.

12. The cutting tool of claim 11, wherein each primary gullet extends from a corresponding noncutting protrusion at an initial slope of about 17 degrees.

13. The cutting tool of claim 1, wherein the primary gullet depths of adjacent primary gullets are varied.

14. The cutting tool of claim 1, wherein the body includes a generally cylindrical body having an open end and a closed end, and wherein the plurality of cutting teeth and the plurality of gullets are formed on the open end of the generally cylindrical body.

15. A cutting tool comprising:
    a body having a cutting edge;
    a plurality of cutting teeth formed on the cutting edge of the body, each cutting tooth including a tip, a rake face extending from the tip, a planar relief portion extending from the tip, a concave relief portion extending from the planar relief face portion, and a convex relief portion extending from the concave relief portion; and
    a plurality of gullets formed on the cutting edge of the body, each gullet being formed between the rake face of one cutting tooth and the convex relief portion of an adjacent cutting tooth, each gullet having a base and a gullet depth measured from the base to the tip of a corresponding cutting tooth;
    wherein each convex relief portion is located approximately halfway between the tips of two adjacent cutting teeth;
    wherein each cutting tooth has a tooth width measured from the rake face through the convex relief portion, and wherein the concave relief portion of each cutting tooth forms at least about 40% of the tooth width;
    wherein a first height, measured from the base of each gullet to the convex relief portion of the corresponding cutting tooth, is between about 55% and 75% of the gullet depth; and
    wherein the planar relief portion of each cutting tooth forms at most about 35% of the tooth width.

16. The cutting tool of claim 15, wherein the concave relief portion of each cutting tooth forms between about 60% and about 75% of the tooth width.

17. The cutting tool of claim 15, wherein the planar relief portion of each cutting tooth forms between about 15% and about 35% of the tooth width.

18. The cutting tool of claim 15, wherein each cutting tooth includes a first portion and a second portion connected together along a weld line, wherein the concave relief portion of each cutting tooth forms a secondary gullet between the tip and the convex relief portion, and wherein the secondary gullet is positioned on one side of the weld line.

19. The cutting tool of claim 15, wherein each gullet has a gullet width measured from the rake face of the one cutting tooth to the convex relief portion of the adjacent cutting tooth, and wherein the tooth width is generally equal to the gullet width.

20. The cutting tool of claim 15, wherein the rake face of each cutting tooth extends from the tip at a positive rake angle of about 7 degrees, and wherein each gullet extends from the convex relief portion of the adjacent cutting tooth at an initial slope of about 17 degrees.

21. The cutting tool of claim 15, wherein the gullet depths of adjacent gullets are varied.

22. The cutting tool of claim 15, wherein the body includes a generally cylindrical body having an open end and a closed end, and wherein the plurality of cutting teeth and the plurality of gullets are formed on the open end of the generally cylindrical body.

\* \* \* \* \*